Dec. 8, 1959    J. G. O'NEIL    2,915,952
APPARATUS FOR FORMING CONTAINERS
Filed Dec. 24, 1953    7 Sheets-Sheet 1
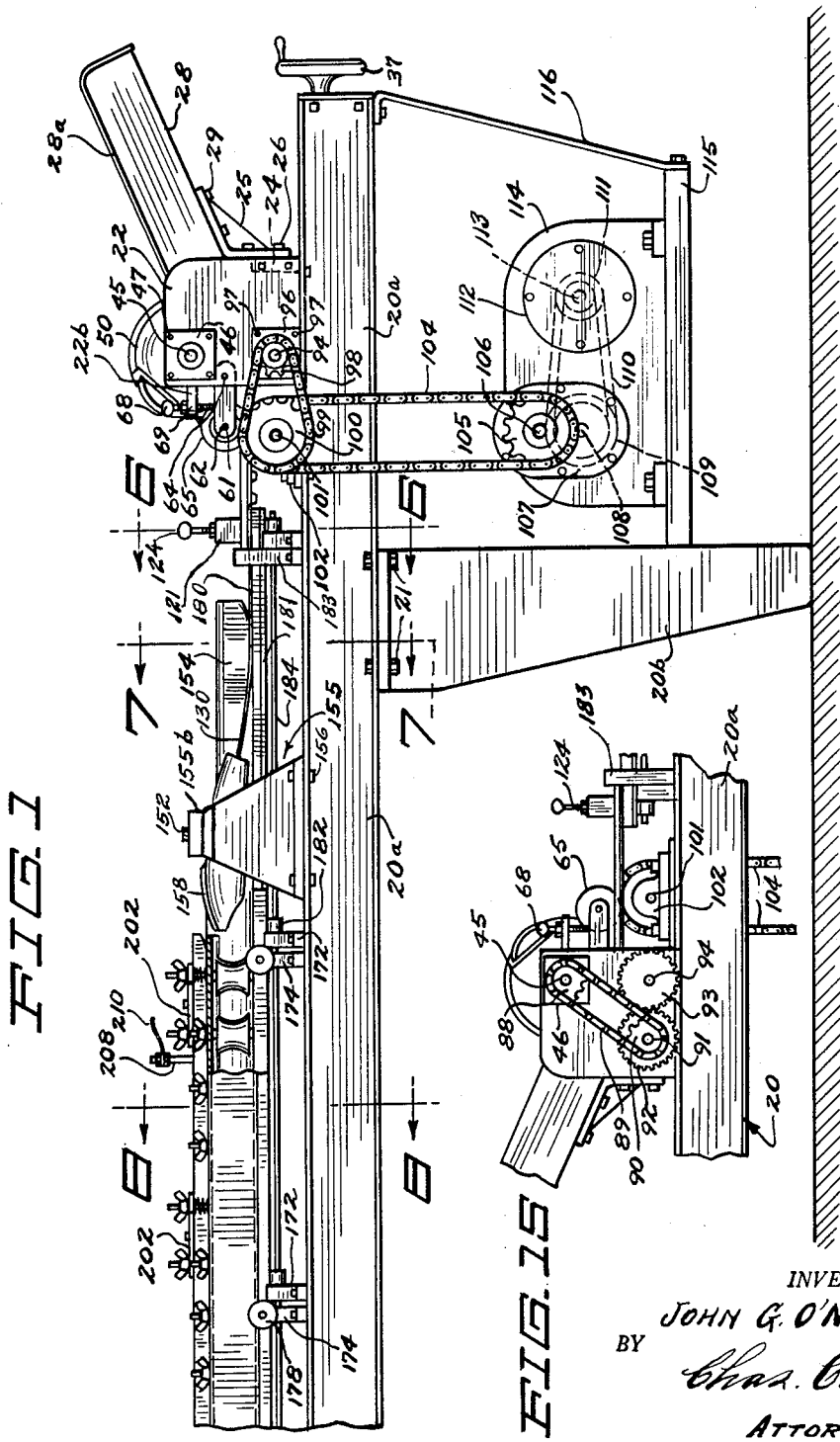
INVENTOR.
JOHN G. O'NEIL
BY
Chas. C. Reif
ATTORNEY

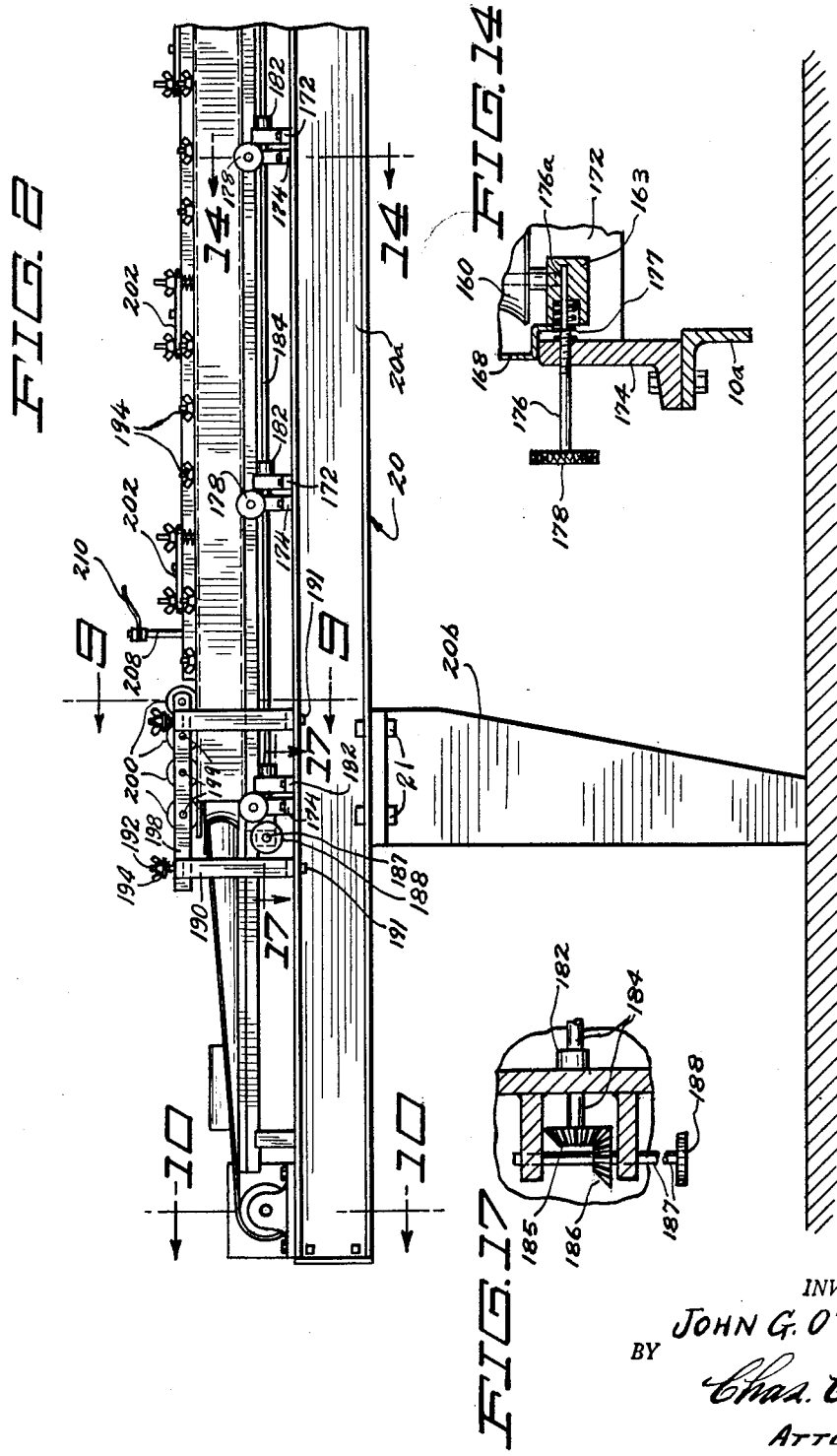

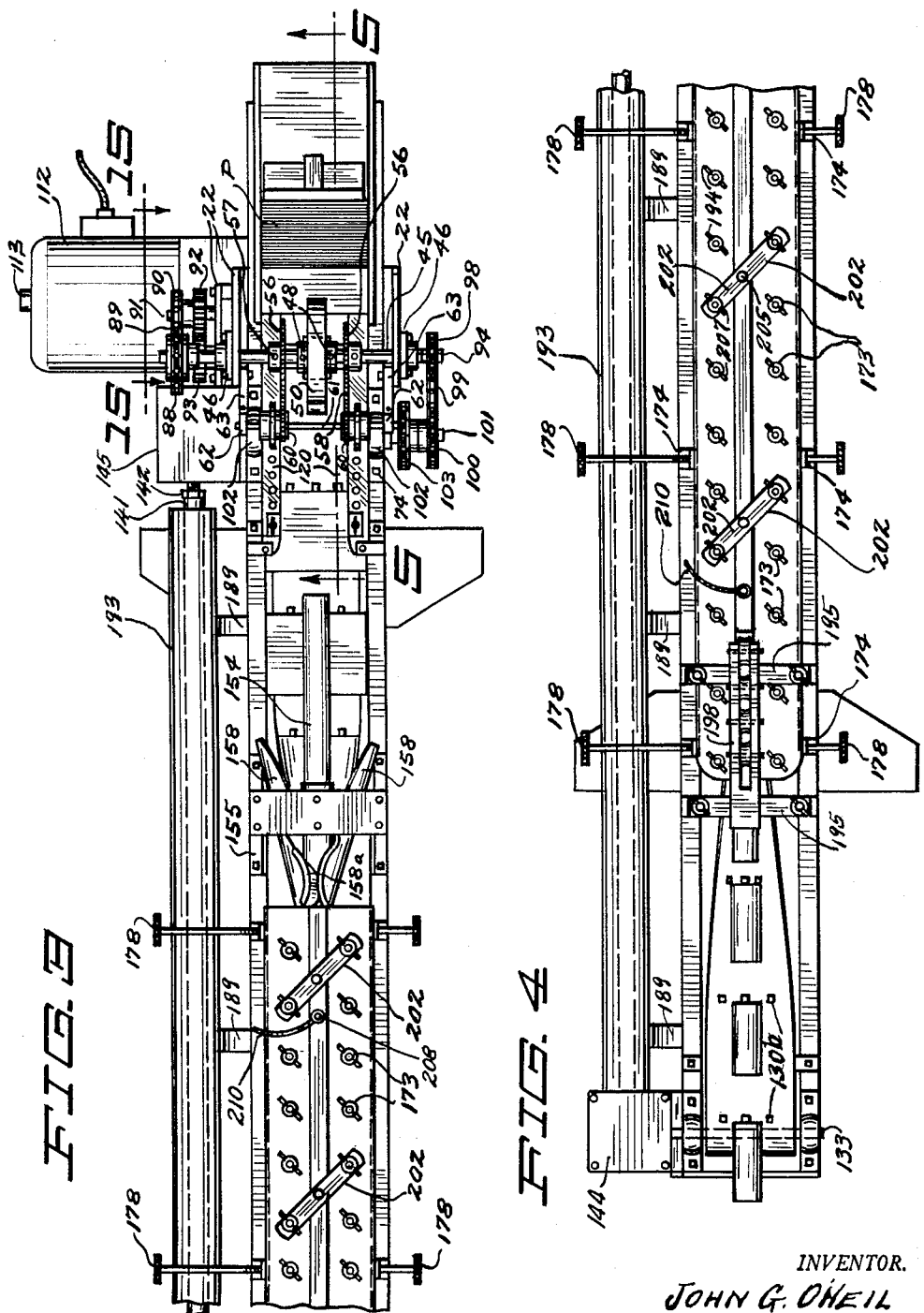

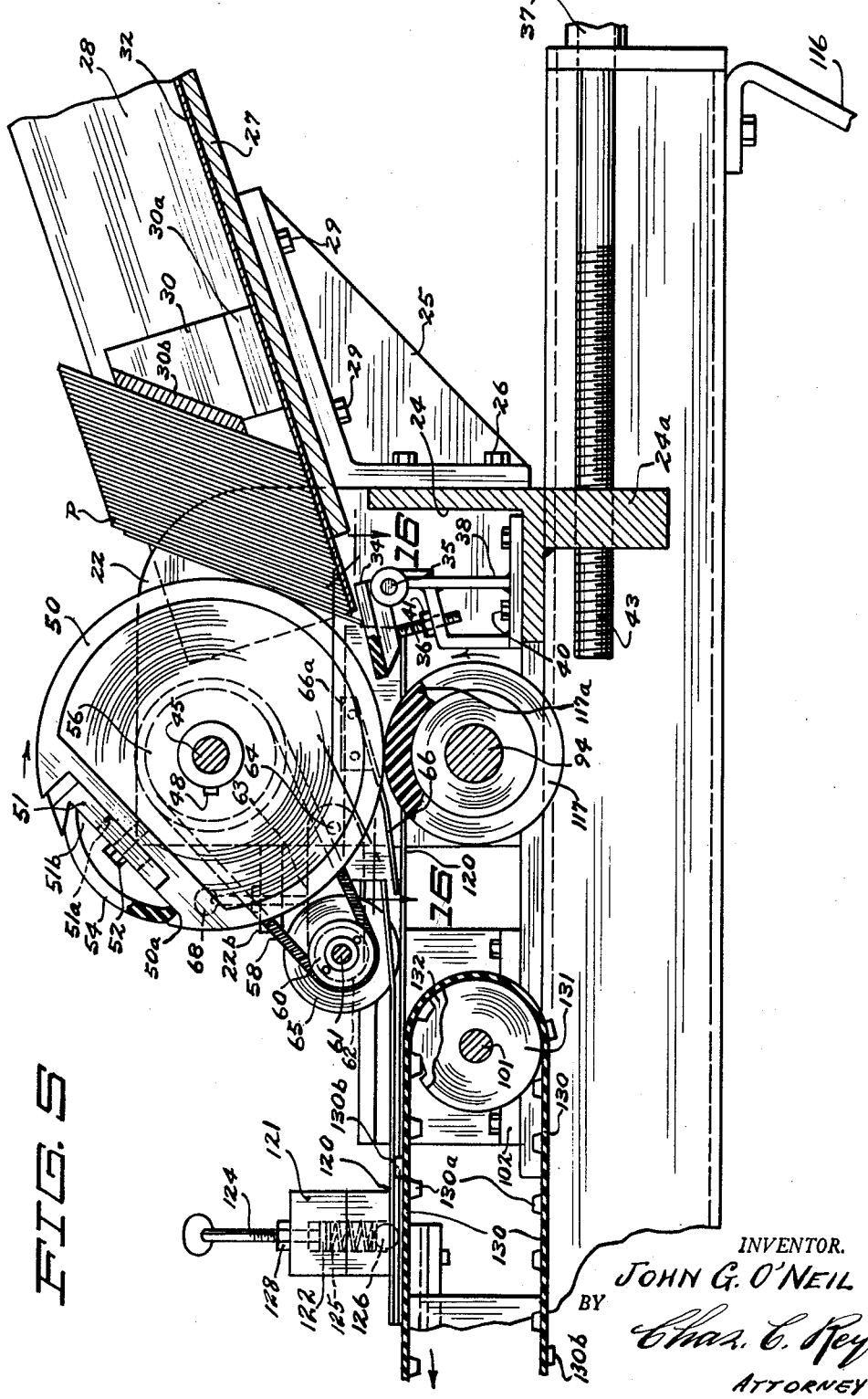

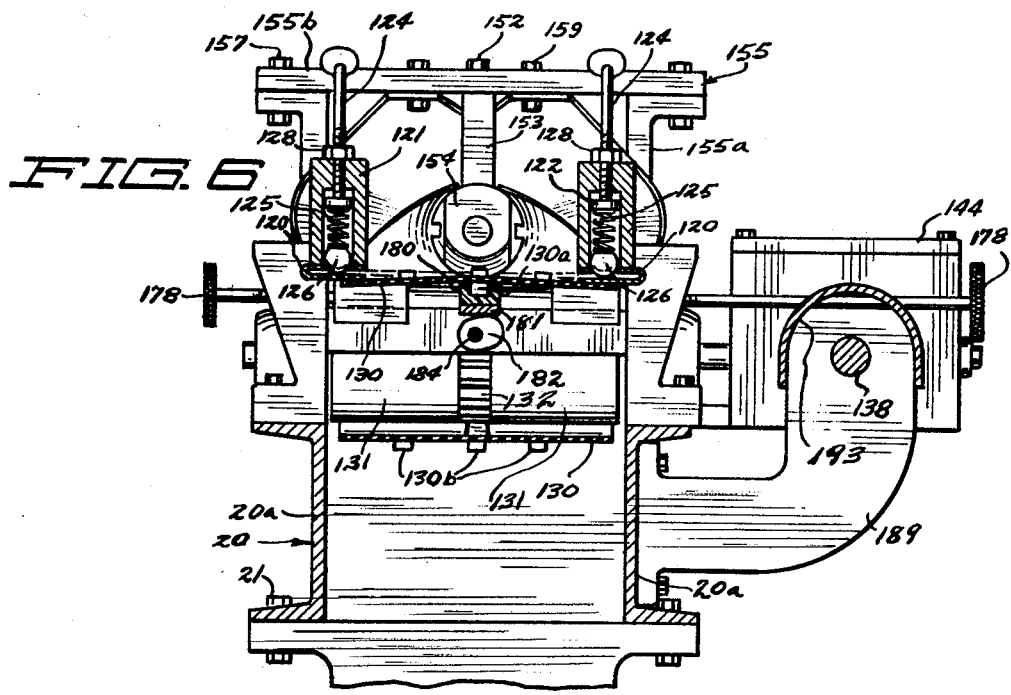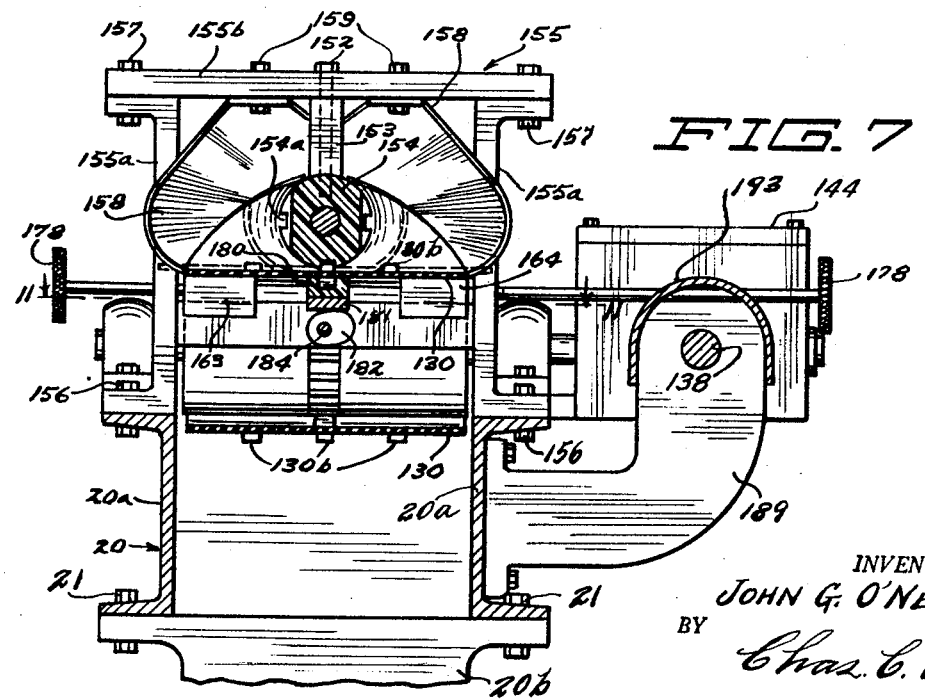

Dec. 8, 1959  J. G. O'NEIL  2,915,952
APPARATUS FOR FORMING CONTAINERS
Filed Dec. 24, 1953  7 Sheets-Sheet 6
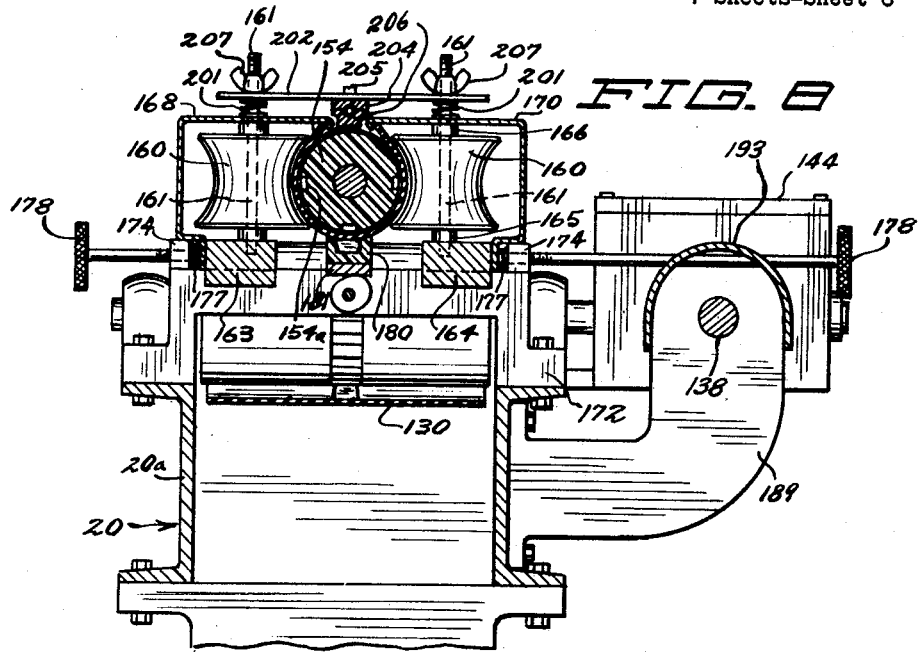
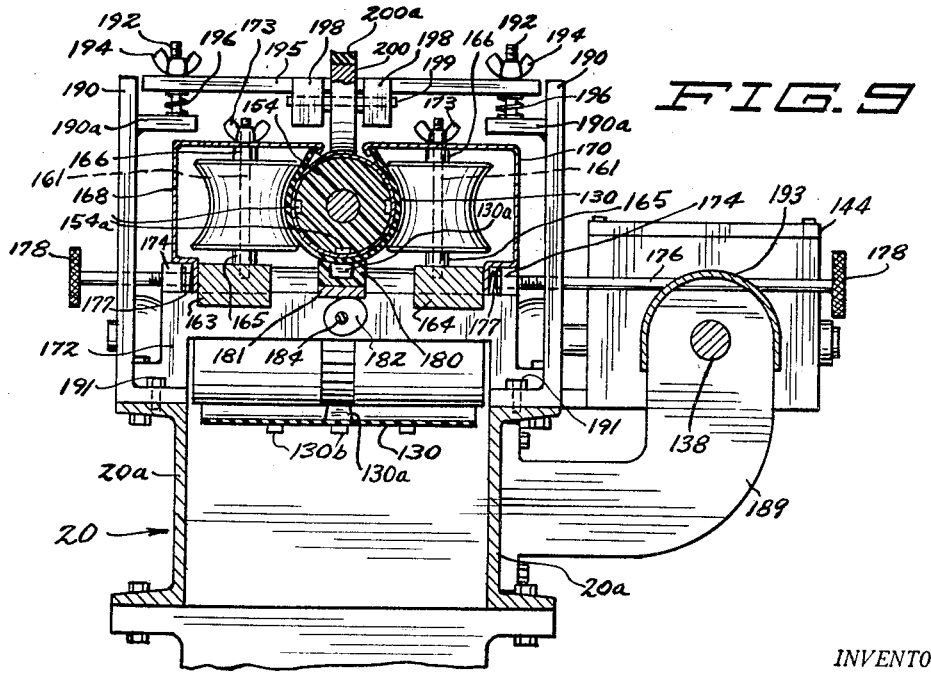
INVENTOR.
JOHN G. O'NEIL
BY
ATTORNEY Dec. 8, 1959  J. G. O'NEIL  2,915,952
APPARATUS FOR FORMING CONTAINERS
Filed Dec. 24, 1953  7 Sheets-Sheet 7
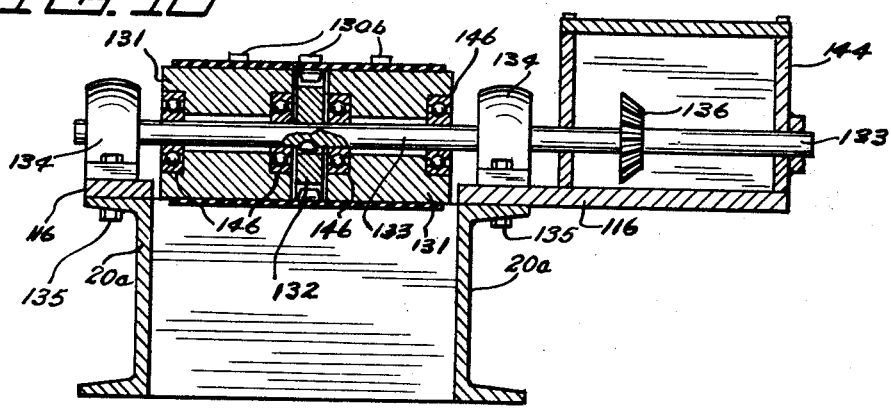
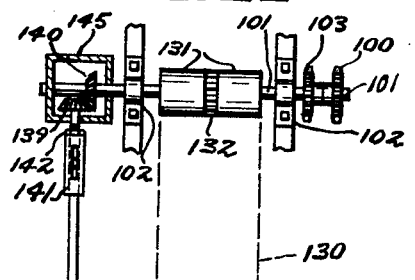
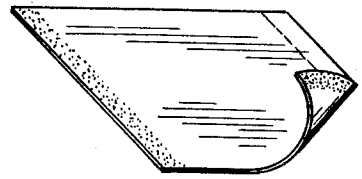
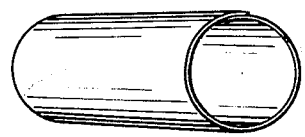
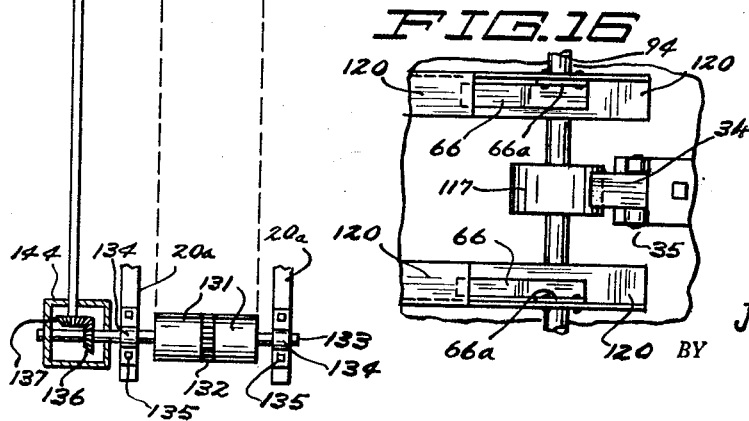
INVENTOR.
JOHN G. O'NEIL
BY
Chas. C. Reif
ATTORNEYS

United States Patent Office 2,915,952
Patented Dec. 8, 1959

2,915,952

APPARATUS FOR FORMING CONTAINERS

John G. O'Neil, Minneapolis, Minn., assignor to Safe-Pack Container Co., Minneapolis, Minn., a corporation of Minnesota Application December 24, 1953, Serial No. 400,330

8 Claims. (Cl. 93—82)

This invention relates to an apparatus for forming a container. In accordance with this invention said container has a body formed from a piece of flexible sheet material which is of substantially rectangular form. Said piece is formed into substantially cylindrical form with two parallel overlapping edge portions secured together.

It is an object of this invention to provide a simple and efficient apparatus by means of which a piece of flexible sheet material may be quickly folded into cylindrical form with two parallel overlapping edge portions secured together.

It is another object of the invention to provide an apparatus by means of which pieces of flexible sheet material may be successively fed from a stack and rapidly and successively formed into cylindrical form.

It is a further object of the invention to provide an apparatus for forming a container comprising means for progressing or feeding a piece of flexible sheet material, a flexible moving endless belt into contact with which said piece is fed, a mandrel disposed longitudinally of said belt, and means for folding the side portions of said belt and thus said sheet about said mandrel, overlapping the edge portions of said sheet and securing the edge portions together.

It is still another object of this invention to provide an apparatus for forming a container comprising an endless flexible belt, said belt having teeth on its inner surface, a driven gear meshing with said teeth for driving said belt, means for moving a piece of flexible sheet material into contact with said belt, a mandrel disposed longitudinally of said belt, means for folding the edge portions of said belt and thus said sheet about said mandrel, and means for connecting the edge portions of said sheet.

It is also an object of this invention to provide an apparatus for forming a container comprising an endless belt of flexible material, means for moving a piece of flexible material into contact with said belt, said piece having an advancing edge, and means for positioning said edge so that it extends substantially at right angles to the direction of movement of said belt.

It is a further object of this invention to provide an apparatus for forming a container comprising an endless flexible belt, means for driving said belt, means for moving a piece of flexible sheet material into contact with said belt, a mandrel disposed longitudinally of said belt, means for moving the edge portions of said belt about said mandrel to fold said sheet closely about said mandrel, and pressure supplying means engaging the sides of said belt and pressing the same about said mandrel to engage said sheet closely against said mandrel.

These and other objects of said invention will be fully disclosed in the following description made in connection with the accompanying drawings, in which like reference characters refer to the same parts throughout the different views, and in which:

Fig. 1 is a view in side elevation of the front portion of the apparatus of this invention;

Fig. 2 is a view in side elevation of the rear portion of the apparatus of this invention;

Fig. 3 is a top plan view of the front portion of said apparatus;

Fig. 4 is a top plan view of the rear portion of said apparatus;

Fig. 5 is a vertical section taken on line 5—5 of Fig. 3;
Fig. 6 is a vertical section taken on line 6—6 of Fig. 1;
Fig. 7 is a vertical section taken on line 7—7 of Fig. 1;
Fig. 8 is a vertical section taken on line 8—8 of Fig. 1;
Fig. 9 is a vertical section taken on line 9—9 of Fig. 2;
Fig. 10 is a vertical section taken on line 10—10 of Fig. 2;
Fig. 11 is a horizontal section taken on line 11—11 of Fig. 7, some parts being omitted and others shown in plan view, said above sections being taken respectively as indicated by the arrows;
Fig. 12 is a perspective view of a piece of sheet material from which the container is formed;
Fig. 13 is a perspective view of the sheet when formed and sealed into substantially cylindrical form;
Fig. 14 is a partial vertical section taken on line 14—14 of Fig. 2;
Fig. 15 is a partial view in side elevation looking at the side of the machine opposite that seen in Fig. 1;
Fig. 16 is a top plan view of parts just below line 16—16 of Fig. 5; and
Fig. 17 is a horizontal section taken on line 17—17 of Fig. 2.

Referring to the drawings, an apparatus is shown comprising a frame 20, said frame comprising laterally spaced, horizontally extending channels 20a shown as having their channels facing away from each other, said channels being supported upon legs 20b adjacent to the front and rear thereof. Said legs are secured to said channels by headed and nutted bolts 21. Adjacent to the front of the machine, as shown in Figs. 1 and 5, plates 22 are secured to the tops of channels 20a, said plates being connected to an angle member 24 and to which is secured a bracket 25. Bracket 25 is secured to member 24 by bolts 26. A chute-like hopper 28 is shown having vertical sides and a downwardly inclined bottom. Hopper 28 is secured to a plate 27 carried on bracket 25 and secured thereto by bolts 29. The top and front edges of the sides of hopper 28 are rolled outwardly to form a partial bead 28a. A follower 30 has a base portion 30a resting on the bottom of hopper 28, said follower having a plate 30b extending downwardly and rearwardly at an angle to said bottom. A member 34 having a flat top surface extends across the lower end of hopper 28, said surface extending downwardly and rearwardly. Member 34 swings on a pivot 35 and is engaged by the top of a screw 36 threaded into a portion of a bracket 38 secured by bolts 40 to member 24. Bracket 38 has spaced hub portions in which pivot 35 is carried. A nut 41 is threaded on screw 36 and engages bracket 38. Member 24 has a depending portion 24a into which is threaded a screw 43, which has secured thereto at the front end of frame 20a a handwheel 37.

A shaft 45 is journaled in bearings 46 secured to the outer sides of plates 22 by bolts 47. Shaft 45 has secured thereto by any suitable means, such as the set screws 48, a wheel 50. Wheel 50 is disposed substantially centrally of hopper 28 and the same has a segmental recess formed in its periphery in which is disposed a slide 51 held in place by a bolt 52. Slide 51 has a slot 51a therein through which bolt 52 passes and slide 51 can thus be held in different positions in the said recess in wheel 50. A flexible piece of resilient frictional material 54 is positioned to have one end disposed in an angular recess 51b in slide 51 and to have its other end disposed in an angle 50a forming part of the recess in wheel 50. Member 54 will be made of rubber or similar frictional and preferably resilient material. Sprockets or pulleys 56 are secured to shaft 45 at each side of wheel 50 in any suitable manner, as by set screws 57, said pulleys being substantially equidistant from wheel 50. Belts 58 run over sprockets or pulleys 56 and also over sprockets or pulleys 60 secured to a shaft 61 journaled in bearings 62 formed in arms 63, swingingly mounted on pivots 64 in the rear portions of plates 22. A pair of wheels 65 are secured to the shaft 61. Screws 68 are threaded in arms 22b, which arms project rearwardly from plates 22 respectively. Screws 68 have nuts 69 threaded thereon engaging the tops of arms 22b respectively. The bottoms of screws 68 engage the tops of arms 63 to limit the upper position of wheels 65. Shaft 45 extends beyond one bearing 46 and has secured thereto a sprocket 88 (Fig. 15) over which runs a chain 89 also running over a sprocket 90 secured to a stub shaft 91 secured in one plate 22. Shaft 91 has secured thereon a gear 92, meshing with a gear 93 secured to a shaft 94. Shaft 94 extends across frame 20 and is journaled in bearings 96 (Fig. 1) secured to plates 22 by bolts 97. Shaft 94 has a sprocket 98 secured thereto over which runs a chain 99 also running over a sprocket 100 secured to a shaft 101 journaled in bearings 102 (see Fig. 11) secured to channels 20a. Shaft 101 has thereon a second sprocket 103 over which runs a chain 104 also running over a sprocket 105 secured to a shaft 106 secured to a reduction gearing in a casing 107. A shaft 108 is secured to said reduction gearing and has a pulley 109 secured thereto. A belt 110 runs over pulley 109 and also over a pulley 111 secured to the drive shaft 113 of a motor 112. Shaft 113 is journaled in bearings in a housing 114, enclosing pulleys 109 and 111, and belt 110. Housing 114 is bolted to a supporting plate 115 supported on one leg 20b and by a bracket 116 secured to one channel 20a and to plate 115.

A roller 117 (Fig. 5) is secured to shaft 94 and is disposed under wheel 50. Roller 117 has a peripheral portion 117a made of rubber or suitable frictional and preferably resilient material. Member 54 on wheel 50 moves close to roller 117.

A pair of plates 120 extending longitudinally of frame 20 are disposed respectively below wheels 65, said plates being in the form of channels having their open sides facing each other. (See Figs. 3, 5 and 6.) Said plates 120 form guides for pieces of flexible sheet material P shown in hopper 28 in Fig. 5. Members 121 rest on plates 120 respectively and upstand therefrom, said members having bores therein in which are disposed pistons 122 secured to screws 124 respectively, said screws having winged heads. Pistons 122 engage coiled compression springs 125 which in turn engage balls 126 which extend partially through the top flange of channels 120 respectively. Nuts 128 are threaded on screws 124 and engage the tops of members 121 respectively. A pair of plates 66 (Figs. 5 and 16), having brackets 66a secured to upstanding portions of the plates 120, are positioned at either side of the roller 117.

An endless belt 130 runs over drums 131, said drums 131 being disposed adjacent the wheels 65 and adjacent the rear end of the machine respectively. Gear 132 at the front of the machine is secured to shaft 101. The upper and lower runs of the belt 130 extend substantially horizontally at the front end of said belt. Belt 130 has teeth 130a on its inner surface and gears 132 mesh with teeth 130a and are driven to drive said belt. Belt 130 has spaced groups of projections 130b on its outer surface, the projections 130b in each group being alined transversely of said belt and being shown as three in number. Gear 132 at the rear end of belt 130 is secured to a shaft 133 journaled in bearings 134 bolted to channels 20a by headed and nutted bolts 135. Shaft 133 has secured thereto a beveled gear 136. Gear 136 meshes with a beveled gear 137 secured to a shaft 138 which extends along one side of the frame 20 and has secured to its other end a beveled gear 139. Beveled gear 139 meshes with a beveled gear 140 secured to shaft 101 above described. Shaft 138 is shown as divided adjacent one end and having its portions disposed in a coupling member 141. Shaft 138 is threaded adjacent said coupling and a nut 142 is threaded thereon engaging the end of coupling 141. Coupling 141 is non-rotatably secured to the portions of shaft 138 and said portions can be moved longitudinally to lengthen or shorten shaft 138. Shaft 138 in Figs. 6 to 9 is shown as housed in a cylindrical casing 193 and journaled in spaced brackets 189 secured to the sides of the channel 20a. Casing 193 extends from a box-like casing 144 which houses gears 136 and 137 to adjacent a similar casing 145 which houses gears 139 and 140.

Drums 131 are carried on ball bearings 146 (Fig. 10) and rotate in said bearings about shafts 101 and 133.

A mandrel 154 is positioned above the belt 130 by being held against a bar 153 by a headed bolt 152 extending over the crossbar 155b of a bracket 155 and through said bar. Bracket 155 has vertical side members 155a having flanges bolted to channels 20a respectively by bolts 156. Members 155a have upper flanges bolted to the crossbar 155b by headed and nutted bolts 157. Bar 153 engages the top of mandrel 154 and the underside of crossbar 155b. Mandrel 154 at its front end portion has flat sides, as shown in Figs. 1 and 6. Said mandrel tapers somewhat rearwardly at its underside and its rear portion is cylindrical, as shown in Figs. 1 and 3 and in the sections in Figs. 8 and 9. Mandrel 154 has a number of slots 154a in its periphery circumferentially spaced so as to receive the projections 130b when belt 130 is folded about said mandrel. The mandrel obviously may be constructed of one or more pieces provided the slots 154a extend continuously thereof.

A cam member 158 has top portions secured to bar 155b by headed and nutted bolts 159. Member 158 has its sides curved and tapers rearwardly to be of frustoconical form, as shown in Fig. 3. As shown in Fig. 7, the lower sides of cam 158 extend substantially to the bottom of mandrel 154. The belt 130 runs through the cam member 158 and said cam folds the side portions of the belt upwardly, as shown in Figs. 7 and 8. Cam 158 has a portion 158a on one of its sides at the upper portion thereof and its small end. Portion 158a extends downwardly so as to be lower than, and extends somewhat under the adjacent upper side of member 158.

In the rear of cam member 158 quite a number of rollers 160 are disposed at either side of mandrel 154. Each of the rollers 160 has a concave periphery and said periphery is curved so that an element thereof is substantially parallel to the periphery of mandrel 154. Each roller 160 rotates about a shaft 161 and said shafts at one side of mandrel 154 have their lower ends disposed in a bar 163. Shafts 161 at the other side of mandrel 154 have their lower ends in a bar 164. Collars 166 and 165 are disposed on shafts 161 at the top and bottom of rollers 160 respectively. A casing 168 encloses the rollers 160 at one side of mandrel 154 and a similar casing 170 encloses the rollers 160 at the opposite side of mandrel 154. The lower ends of casings 168 and 170 are bent inwardly and then downwardly. The inwardly bent portions of said casings are supported on brackets 174. The downwardly extending portions at the lower sides of casings 168 and 170 are disposed between brackets 174 and bars 163 and 164 respectively. The top portions of casings 168 and 170 have their inner ends reversely bent downwardly to form small channels. When the belt 130 is folded around mandrel 154 the edges of said belt move in said channels. The shafts 161 extend through the tops of casings 168 and 170 and have threaded upper ends on which are threaded wing nuts 173 engaging the top of said casings. Bars 163 and 164 are supported on spaced brackets 172 secured to channels 20a. Said brackets 172 extend between channels 20a. Bars 163 and 164 have slots in their lower sides fitting over brackets 172.

Brackets 174 are spaced along channels 20a and secured thereto. Screws 176 are threaded in brackets 174 and have their inner ends set some distance into the sides of bars 163 and 164 respectively. Screws 176 have inner reduced portions disposed in bores in bars 163 and 164. (See Fig. 14.) Compression coiled springs 177 are disposed between brackets 174 and bars 163 and 164 respectively. Screws 176 have hand-wheels 178 secured to their outer ends, the same being shown as having knurled peripheries.

A bar 180 extends longitudinally beneath belt 130, the same having a groove therein through which the teeth 130a can move when belt 130 is folded about mandrel 154. Bar 180 is supported at its front and rear ends in brackets 183 secured to frame 20. A plate 181 underlies bar 180 and is engaged by a plurality of cams 182 secured to and rotatable with a shaft 184 extending lengthwise of the machine. Shaft 184 is provided with a beveled gear 185 meshing with a beveled gear 186 secured to a shaft 187 extending to one side of the machine, the same being equipped with a hand-wheel 188.

Spaced pairs of upstanding brackets 190 (Fig. 9) have flanges secured to channels 20a by bolts 191. Brackets 190 have inwardly extending portions 190a to which are secured rods 192. Rods 192 extend respectively through the end portions of bars 195 extending between the upstanding sides of brackets 190 respectively, and said rods 192 have their upper ends threaded and equipped with wing nuts 194 engaging the tops of bars 195. Compression coiled springs 196 are disposed about rods 192 respectively and engage the bottoms of bars 195 and the tops of portions 190a. Bearing bars 198 are secured to and depend from the bars 195 of each bracket 190 in which are journaled shafts 199. Wheels 200 are carried on shafts 199 respectively, the same having peripheral portions 200a which will be made of rubber or similar material. Said peripheral portions are concave on their outer surfaces and curved so that they substantially fit over the overlapped portions of piece P, as shown in Fig. 9.

Certain of the shafts 161 extend some distance above the casings 168 and 170 and are surrounded by coiled compression springs 201 (Fig. 8). Said springs engage the tops of casings 168 and 170 respectively at their lower ends and at their upper ends engage bars 202 respectively through which shafts 161 extend. The upper ends of shafts 161 are threaded and equipped with wing nuts 207 which engage the tops of bars 202. A bar 204 is secured to bars 202 by bolts 205, said bar 204 being divided and having secured between the parts thereof an electrical heating member 206. Bar 204 has its lower surface concave so as to fit over the overlapped portions of the piece P as they are disposed on the mandrel. A pair of rods 208 (Figs. 1 and 2) is secured to bar 204 and electrical conductors 210 are connected to said rods which in turn make contact with the heating member 206.

In operation, motor 112 will be driven which will drive shaft 106 through belt 110 and pulleys 109 and 111. Shaft 106 will drive chain 104 and rotate shaft 101. Shaft 101 will drive gear 132 at the front of the machine. Shaft 101 through gears 140 and 139, shaft 138 and gears 137 and 136, will drive shaft 133 at the rear of the machine. Belt 130 will thus be driven and will run on drums 131. Shaft 101 will also drive shaft 94 through chain 99 and roller 117 is rotated. Shaft 94 through the gears 93 and 92 will drive shaft 91. Shaft 91 through chain 89 will drive shaft 45 and wheel 50. Wheel 50 will thus be rotated as indicated by the arrow in Fig. 5. Shaft 94 will also drive roller 117 as indicated by the arrow in Fig. 5. The pieces of sheet material P which will be made of heavy paper or light cardboard will be placed in hopper 28, as shown in Fig. 5. Said pieces P used with this invention are coated with a lacquer, which when heated will form an adhesive. Said lacquer also forms a waterproof coating on pieces P. Wheels 65 on shaft 61 will be driven from shaft 45 through belts 58. As wheel 50 rotates, member 54 engages the sheet P nearest wheel 50 and moves said sheet downwardly and along the top surface of member 34 and said sheet then moves between member 54 and roller 117. The sheet moves beneath plates 66 and into the channels of plates 120. The advancing edge of the piece P strikes the balls 126 and the ball first engaged will delay the sheet until the advancing edge engages the other ball. The balls thus act to position a sheet so that its advancing edge is at right angles to the direction of movement of belt 130. When the piece P moves into the channels of plates 120, it comes over the belt 130, the projections 130b now engage the rear edge of the piece and it is moved along under balls 126 with the belt 130. The belt 130 moves through the cam member 158. Since the sides of this member extend upwardly in curved form from their lower portions, the side portions of belt 130 are folded upwardly and the piece P is thus folded upwardly. The piece P is now in engagement with the mandrel 154 and as it advances, it is folded more and more as is belt 130, as shown in Figs. 6, 7, 8 and 9. The belt 130 is now folded so that its side edges move in the channels formed in the tops of casings 168 and 170. As the belt 130 is folded about mandrel 154, the projections 130b on the belt enter the slots 154a on the mandrel. These projections will be at one end of the piece P so that the cylindrical surface of piece P is not affected.

When the piece P and belt are folded about the mandrel to the position shown in Figs. 8 and 9, the belt passes between rollers 160. Rollers 160 act to hold the belt 130 and piece P tightly against the mandrel. Bars 163 and 164 can be moved inwardly somewhat by turning the screws 176. The reduced end portions 176a on the screws 176 act to keep the bars in position. Bars 163 and 164 are resiliently held in position by the springs 177. There are quite a number of the rollers 160, as shown in Figs. 3 and 4. The piece P and the belt 130 are thus held closely against mandrel 154, until the belt passes the last of the rollers 160. The bar 180 beneath the belt can be moved upwardly by the cams 182. Said bar acts to hold the central portion of the belt against the mandrel. By turning wheel 188, shaft 184 will be rotated and the spaced cams 182 will be moved to raise the plate 181.

As the piece P is moved along in the cam 158, one edge portion moves over the top rear edge of the cam 158 while the other edge portion is forced downwardly by the portion 158a. This causes the edge portions of piece P to overlap, as shown in Figs. 8 and 9. As these overlapped portions move along the mandrel, they pass under the member 204. Member 204 which contains the heating element 206 supplied with current through conductors 210 and rods 208 is thus heated and heat is thus applied to the overlapped portions of the piece P.

After passing the member 204, the overlapped portions pass under the wheels 200. Wheels 200 press said overlapped portions tightly together between their peripheries and the mandrel. The coating on said overlapped portions is softened and made adhesive by the heat of member 204 and after said portions pass under the wheels 200 they are very firmly secured together. The piece P, which is now in cylindrical form with its edge portions firmly connected moves off the mandrel 154 and is moved along by the projections 130b on belt 130, to the end of the belt and then over the end of the machine frame. The cylindrical members formed by pieces P may drop into any suitable receptacle.

From the above description it will be seen that I have provided a comparatively simple and very efficient apparatus for forming the container bodies. The machine can be run at high speed and the container bodies are very rapidly produced.

The drums 131 are journaled on their respective shafts so that there will not be two forces operating on the belt 130 as would be the case if one set of drums were driven.

It will of course be understood that various changes may be made in the form, details, arrangement and proportions of the apparatus without departing from the scope of applicant's invention, which, generally stated, consists in apparatus capable of carrying out the objects above set forth, such as disclosed and defined in the appended claims.

What is claimed is:

1. An apparatus for forming a container having in combination, a moving belt adapted to carry a piece of sheet material, a mandrel, means for folding said belt about said mandrel and holding said sheet and belt closely about said mandrel, said belt having members thereon for engaging and moving said sheet, said mandrel having recesses therein into which said members move when said belt is folded about said mandrel.

2. In an apparatus for making a tubular article from a flexible sheet having an advancing edge, a continuous movable flexible belt for forming said sheet about a stationary mandrel as it moves said sheet lengthwise of said mandrel, a pair of yieldable restraining means arranged at right angles with said mandrel, means for advancing said sheet toward said yieldable restraining means, said restraining means being engageable with the advancing edge of said sheet for positioning it at right angles to the direction of movement of said belt, lugs on said belt engageable with the trailing edge of said sheet for progressing said sheet lengthwise of the mandrel after it has been positioned by said yieldable restraining means, said yieldable restraining means comprising channels for guiding said flexible sheets, balls extending partially through said channel and into the path of movement of said flexible sheets, and adjustable means urging said balls yieldingly into said path of movement.

3. An apparatus for forming a container having, in combination, means for engaging and progressing a piece of flexible sheet material, an endless belt onto which said sheet is moved, a mandrel above said belt, means for progressively folding the sides of said belt and sheet upwardly around said mandrel, means for bringing the edge portions of said sheet into overlapping relation, means for connecting said edge portions of said sheet to form a cylinder, said belt having teeth on its inner surface adjacent its median line, a driven gear engaging said teeth, and drums at each side of said gear, over which said belt runs, said drums being journaled for free rotation and being rotated by said belt.

4. In apparatus for making a tubular article comprising a continuous flexible belt for engaging and progressing a sheet of flexible material lengthwise of a stationary mandrel, means for progressively deflecting the belt and sheet supported thereon into substantial surface area contact with the mandrel, said belt having teeth on its inner surface, a driven gear engaging said teeth and drums over which said belt runs, said drums being journaled for free rotation and being rotated by said belt.

5. In an apparatus for making a tubular article from a flexible sheet, an elongated mandrel, an endless flexible belt engageable with said sheet for moving it lengthwise of the mandrel, means for progressively deflecting the belt and sheet engaged thereon into substantial surface area contact with the mandrel, means for guiding the edges of the deflected portion of the belt to provide a gap between said edges, and means disposed within the gap engageable with marginal portions of the sheet and adapted to secure the same in overlapped relationship to form a longitudinally seamed tubular container body.

6. In an apparatus for making a tubular article from a flexible sheet, an elongated mandrel, an endless flexible belt engageable with said sheet for moving it lengthwise of the mandrel, means for progressively deflecting the belt and sheet engaged thereon into substantial surface area contact with the mandrel, a casing at each side of the belt adjacent said deflecting means, said casing having reversely bent edge portions forming channels for guiding the edges of the belt to provide a gap between said edges, and means disposed within the gap engageable with marginal portions of the sheet and adapted to secure the same in overlapped relationship to form a longitudinally seamed tubular container body.

7. In an apparatus for making a tubular article from a flexible sheet, an elongated mandrel, an endless flexible belt engageable with said sheet for moving it lengthwise of the mandrel, means for progressively deflecting the belt and sheet engaged thereon into substantial surface area contact with the mandrel, means for guiding the edges of the deflected portion of the belt to provide a gap between said edges, means disposed within the gap for overlapping marginal portions of said sheet, a roller disposed within said gap overlying said overlapped portions, and resilient means for pressing said roller against said overlapped portions.

8. A machine for forming containers comprising a mandrel, a belt adapted to carry a plurality of container blanks comprising pieces of sheet material, means for moving the belt lengthwise of the mandrel, means for deflecting the belt and the blanks about said mandrel and holding the blanks and belt closely thereagainst, said belt having projecting lugs for engaging and moving said blanks lengthwise of the mandrel and at least one recess formed lengthwise of said mandrel to accommodate said lugs when the belt and blanks are deflected about the mandrel and moved lengthwise thereof.

References Cited in the file of this patent

UNITED STATES PATENTS

| | | |
|---|---|---|
| 644,025 | White | Feb. 20, 1900 |
| 808,348 | Dichman | Dec. 26, 1905 |
| 1,752,608 | Olgay | Apr. 1, 1930 |
| 2,019,375 | Wheelwright | Oct. 29, 1935 |
| 2,133,726 | Staude | Oct. 18, 1938 |
| 2,192,950 | Widell | Mar. 12, 1940 |
| 2,222,011 | Zwoyer | Nov. 19, 1940 |
| 2,256,263 | Haycock | Sept. 16, 1941 |
| 2,381,853 | La Bombard | Aug. 7, 1945 |
| 2,422,188 | Epstein | June 17, 1947 |
| 2,423,554 | Davidson | July 8, 1947 |
| 2,480,493 | Martin | Aug. 30, 1949 |

FOREIGN PATENTS

| | | |
|---|---|---|
| 113,245 | Germany | Sept. 4, 1900 |